US008789668B2

(12) United States Patent
Alberti et al.

(10) Patent No.: US 8,789,668 B2
(45) Date of Patent: Jul. 29, 2014

(54) MASTER CYLINDER ASSEMBLY, IN PARTICULAR FOR BALANCING A BRAKING SYSTEM OF AN AGRICULTURAL VEHICLE

(75) Inventors: Luigi Alberti, Offanengo (IT); Leonardo Cadeddu, Offanengo (IT)

(73) Assignee: Vhit S.p.A., Offanengo (IT)

( * ) Notice: Subject to any disclaimer, the term of this patent is extended or adjusted under 35 U.S.C. 154(b) by 247 days.

(21) Appl. No.: 13/386,245

(22) PCT Filed: Jul. 13, 2010

(86) PCT No.: PCT/IB2010/053199
§ 371 (c)(1),
(2), (4) Date: Jan. 20, 2012

(87) PCT Pub. No.: WO2011/010245
PCT Pub. Date: Jan. 27, 2011

(65) Prior Publication Data
US 2012/0111678 A1 May 10, 2012

(30) Foreign Application Priority Data

Jul. 22, 2009 (IT) .............................. TO2009A0555

(51) Int. Cl.
*B60T 11/00* (2006.01)
(52) U.S. Cl.
USPC ............................................. 188/345; 303/8
(58) Field of Classification Search
USPC .................................. 303/7, 8, 9.61; 188/345
See application file for complete search history.

(56) References Cited

U.S. PATENT DOCUMENTS

| 2,074,361 A | | 3/1937 | Bowen |
| 3,640,067 A | * | 2/1972 | Ingram ........................... 60/561 |
| 4,547,967 A | * | 10/1985 | Reynolds et al. ................. 303/7 |

FOREIGN PATENT DOCUMENTS

| DE | 26 30 517 A1 | 1/1978 |
| JP | 51-57433 U | 5/1976 |
| JP | 60-151163 A | 8/1985 |

* cited by examiner

*Primary Examiner* — Melanie Torres Williams
(74) *Attorney, Agent, or Firm* — Sughrue Mion, PLLC

(57) ABSTRACT

The invention concerns a master cylinder assembly (10, 110) for balancing the braking of a couple of wheels (LBW, RBW) of a vehicle. Each master cylinder (12) has a hollow body (14), a piston (15) and a chamber (16) suitable for containing a fluid having a primary control pressure depending on a driving force applied on the piston (15) and intended to be transmitted to a utilizing device (LBB, RBB). The assembly further includes a balancing duct (58) into which the chambers (16) come out, and a plurality of normally closed balancing valves (60). Each balancing valve (60) is located between the balancing duct (58) and a respective chamber (16) and has a shutter (62) which is mechanically unconstrained to the primary piston (15) defining the primary chamber (16) to which said primary balancing valve (60) is associated, and which is operable for opening in a manner fluid-controlled by the primary control pressure taken by the fluid contained in the primary chamber (16) to which said balancing valve (60) is associated.

16 Claims, 8 Drawing Sheets

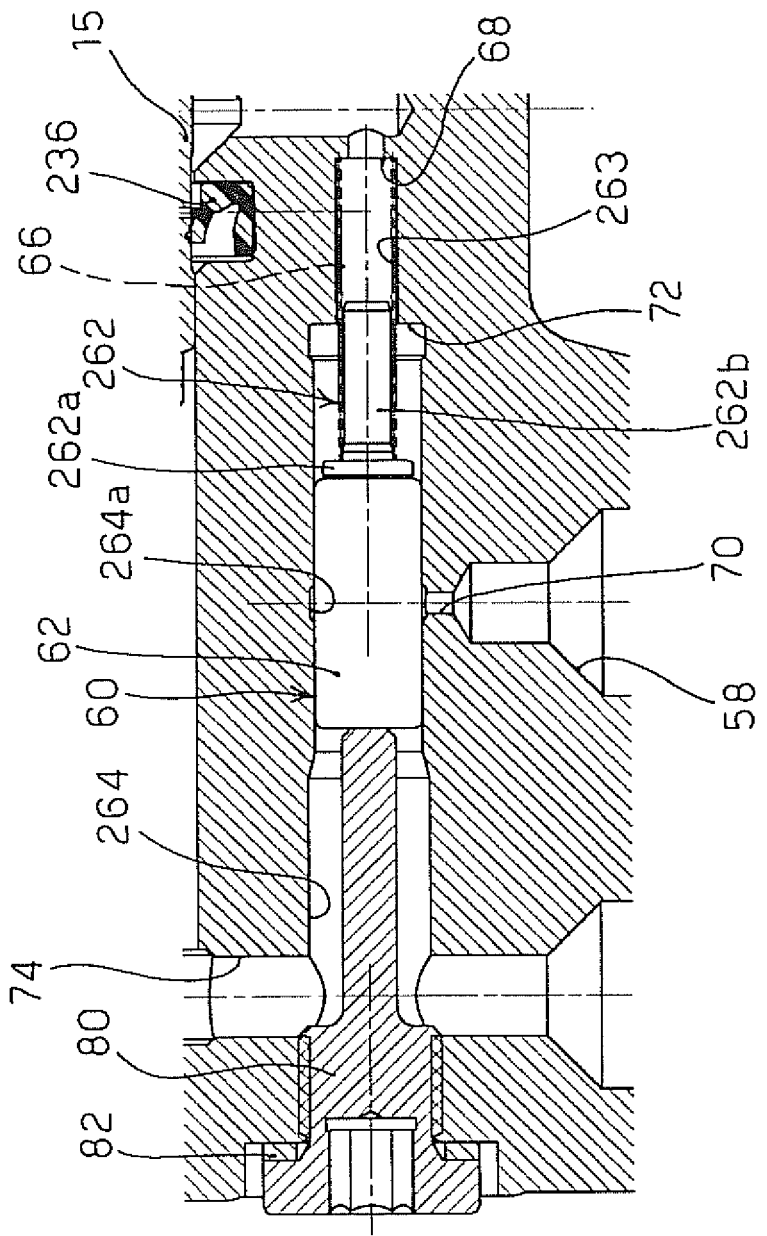

MASTER CYLINDER ASSEMBLY, IN PARTICULAR FOR BALANCING A BRAKING SYSTEM OF AN AGRICULTURAL VEHICLE

CROSS REFERENCE TO RELATED APPLICATIONS

This application is a National Stage of International Application No. PCT/IB2010/053199 filed on Jul. 13, 2010, which claims priority from Italy Patent Application No. TO2009A000555 filed Jul. 22, 2009, the contents of all of which are incorporated herein by reference in their entirety.

TECHNICAL FIELD

The present invention concerns a master cylinder assembly, in particular for balancing a braking system of an agricultural vehicle. More specifically, the present invention concerns a master cylinder assembly according to the preamble of the appended claim 1.

TECHNICAL BACKGROUND

The use of master cylinder assemblies for assisting in steering in the agricultural field is widely known. Actually, in agricultural vehicles, and in particular in tractors, a first and a second pedal are typically used in order to control braking of a left rear wheel and a right rear wheel, respectively, through a master cylinder assembly.

When the driver acts only on either the first or the second pedal, the master cylinder assembly controls braking of the left rear wheel or the right rear wheel only. By this feature, it is possible to assist in agricultural vehicle steering. Such a braking mode is also referred to as "steering braking" or "steering brake system". If on the contrary the driver acts on both pedals, the master cylinder assembly controls braking of both rear wheels so as to carry out a "balanced braking" (i.e. with substantially the same intensity) of both wheels. For safety reasons, such a further braking mode must be ensured when the agricultural vehicle circulates on a road, also in case of failure of the braking system.

An example of such master cylinder assemblies according to the prior art is disclosed in Italian Patent No. 1064013. Such a document mentions the use of a balancing duct interconnecting the chambers of the master cylinders through the interposition of balancing valves, which are normally closed and are directly actuated by the displacement of the respective piston they are associated with. When the driver acts on one of the pedals, the piston connected to the pedal acted on is displaced and opens the corresponding balancing valve. Hence, if the driver acts on both pedals, the master cylinder chambers are in fluid communication with each other through the balancing duct. A pressure difference between the chambers, if any, is cancelled thanks to the connection established by opening the valves coming out in the balancing duct.

Yet, such a master cylinder assembly has some drawbacks.

A drawback is that the piston and the valve shutter are mechanically connected in series. Such an arrangement makes the master cylinder assembly bulky in longitudinal direction, with reference to the operating direction of the piston.

Another drawback is that the shutter seal is obtained by means of sealing gaskets that, in operation, slide against the surfaces of a bore or housing in the master cylinder in which the piston-shutter assembly is slidably mounted. Consequently, the seal performance of the shutter risks being degraded during use of the master cylinder assembly, since the gaskets risk being worn and damaged by the friction against such bore surfaces.

Moreover, the couple of sealing gaskets provided by the shutter have an additional drawback. When the balancing duct is closed at its ends by the balancing valves, the fluid contained therein can be exposed to a temperature increase during operation of the vehicle to which the master cylinder assembly is secured. In such situation, when the brakes are not used, a corresponding pressure increase occurs in the balancing duct and, especially at high operating temperatures, the fluid contained therein can exert considerable pressures onto the sealing gaskets. In this manner, the first time at least one brake pedal is operated, the risk exists of damaging the gaskets because of the high pressure of the fluid contained in the balancing duct. Such a situation results in compromising an effective and proper seal of the balancing valves.

SUMMARY OF THE INVENTION

It is an object of the present invention to obviate the above-mentioned drawbacks and to solve other problems occurring in the prior art.

More particularly, it is an object of the invention to build a master cylinder assembly that has a reduced longitudinal size with reference to the operating direction of the pistons, so that it can suit different design requirements.

It is a further object of the present invention to make a master cylinder assembly in which the balancing valve shutters, in case of a frequent use, have improved sealing performance if compared to the prior art.

The above and other objects are achieved according to the present invention thanks to a master cylinder assembly of the kind specified above and having the features set forth in the appended claims.

The present invention also concerns a braking system for agricultural vehicles and a method of balancing the control pressures generated by a master cylinder assembly.

It is intended that the claims are an integral part of the technical teaching provided in the present specification in respect of the invention.

BRIEF DESCRIPTION OF THE DRAWINGS

Further features and advantages of the present invention will become apparent from the following detailed description, which is given only by way of non-limiting example and where reference is made to the accompanying drawings, in which:

FIG. 8 is a view similar to FIG. 3, but relevant to further variant embodiments of the master cylinder assembly according to the invention.

DETAILED DESCRIPTION

First Embodiment

Simple Master Cylinders

Figure 1:
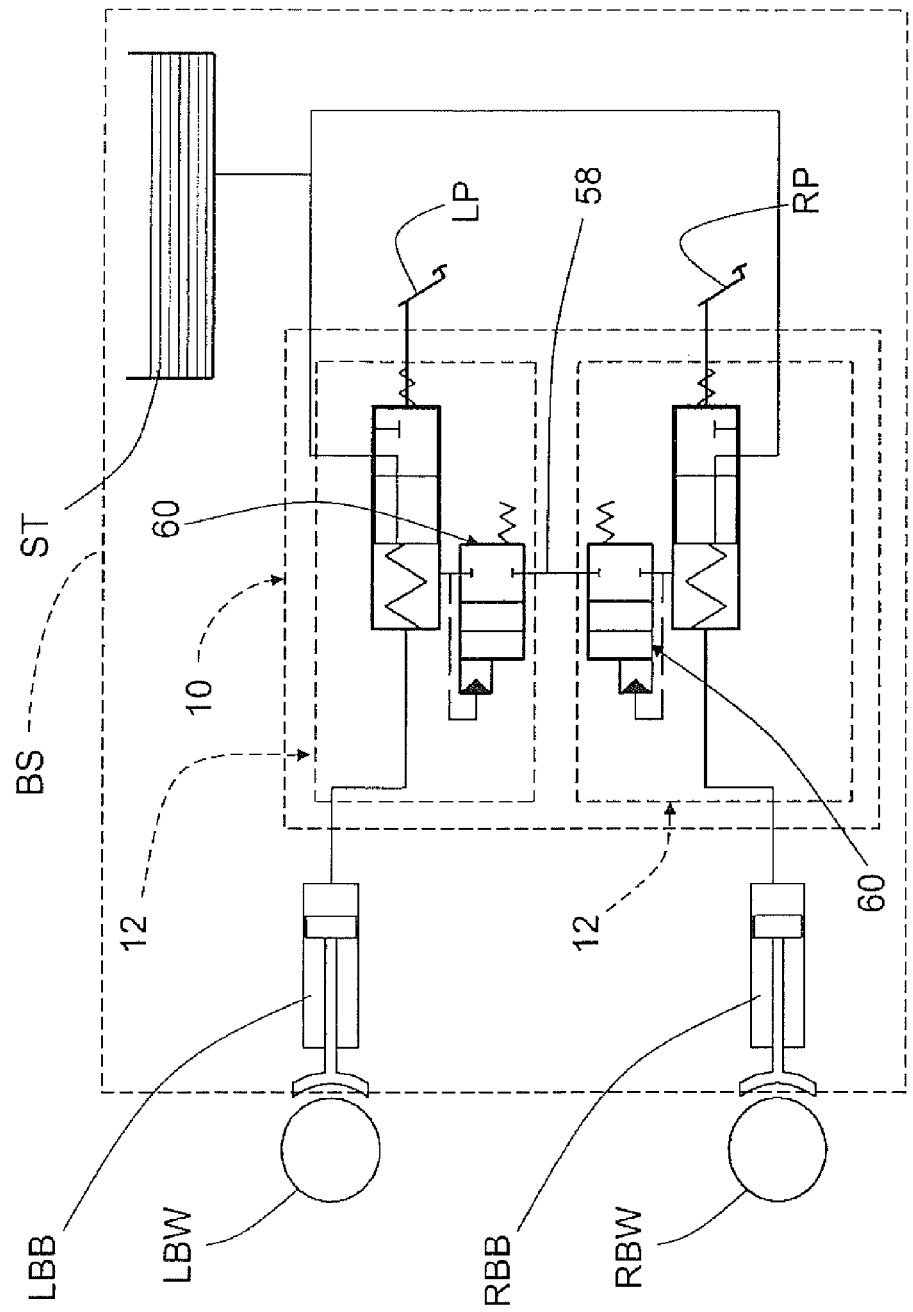
FIG. 1 is a block diagram of a braking system for agricultural vehicles incorporating a first exemplary embodiment of a master cylinder assembly according to the present invention.
Figure 2:
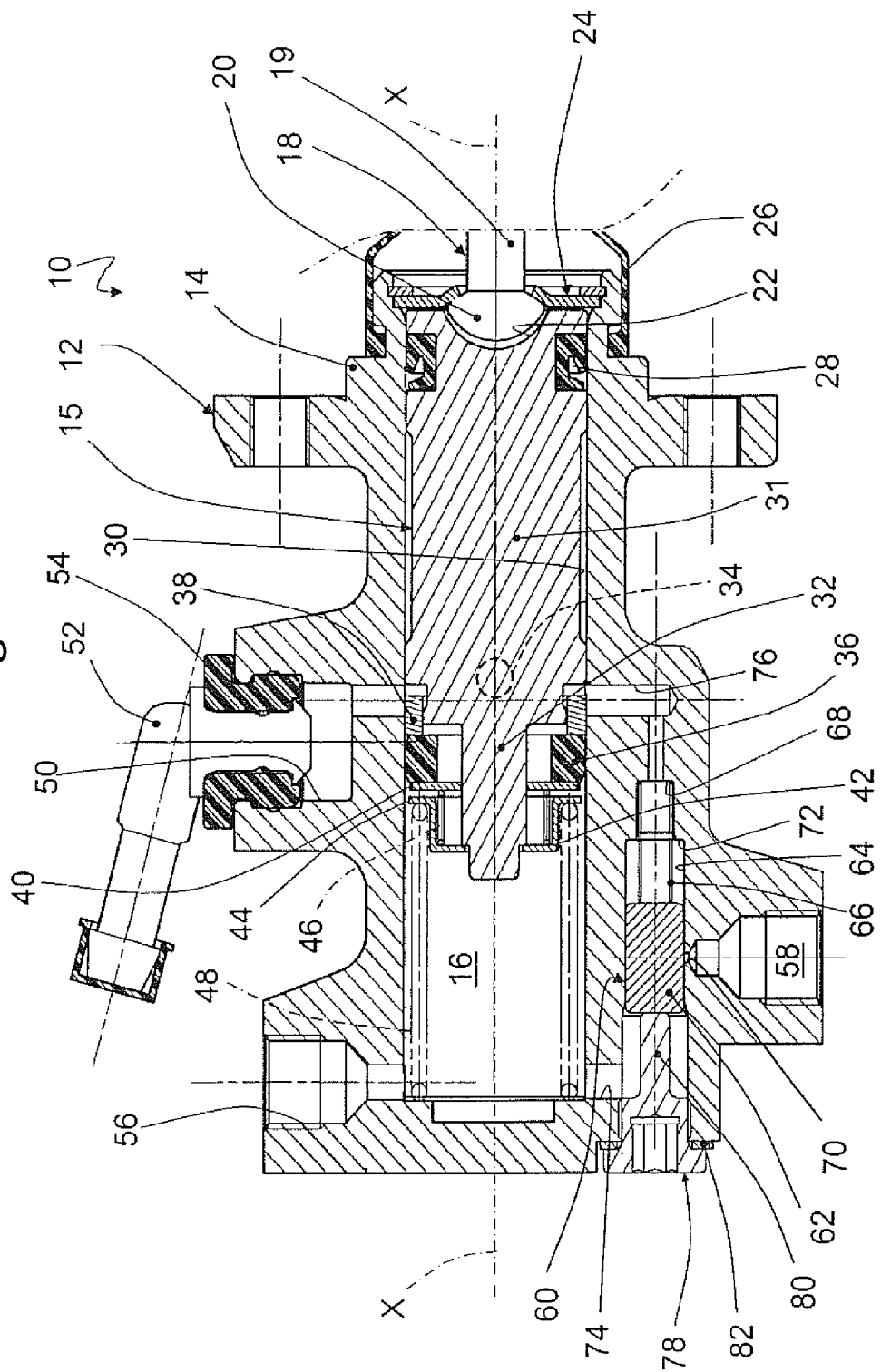
FIG. 2 is a parallel longitudinal cross-sectional view of one of the master cylinders belonging to the first embodiment of the master cylinder assembly schematically shown in FIG. 1.

Referring in particular to FIGS. 1 and 2, a first exemplary embodiment of a master cylinder assembly according to the present invention is generally shown at 10.

In FIG. 1, assembly 10 is part of a braking system generally denoted BS and intended to control the braking of a vehicle (not shown).

In the embodiment shown in FIG. 1, braking system BS includes a supply tank ST containing a fluid (for instance, hydraulic oil for brakes). Moreover, braking system BS includes first and second actuating members, for instance left and right pedals LP and RP, intended to be acted on by a user in order to start braking of first and second brakes associated with first and second vehicle wheels, respectively. In the exemplary embodiment shown in FIG. 1, such brakes are a left rear brake LBB and a right rear brake RBB mutually coordinated and associated with left rear wheel LBW and right rear wheel RBW, respectively. Left and right pedals LP, RP are arranged to be acted on by a user for operating left and right brakes LB, RB, respectively, through assembly 10.

Braking system BS is particularly suitable for controlling braking of a vehicle, such as an agricultural tractor. In particular, such a braking system BS is suitable for performing the so-called "steering braking" function, by applying braking on a single rear wheel during agricultural use of the vehicle, so as to assist in vehicle steering. Moreover, such a braking system BS is arranged to perform the "balanced braking" function, by carrying out a braking with the same intensity on both rear wheels during road use of the vehicle.

Assembly 10 comprises a couple of master cylinders 12. Each master cylinder 12 is arranged to receive the fluid contained in supply tank ST.

Moreover, each master cylinder 12 is connected between a respective pedal LP or RP and the corresponding brake LBB or RBB controlled by said pedal LP or RP. When only one pedal LP or RP is acted on by a user, such a pedal LP or RP generates an output control pressure towards the respective brake LBB or RBB, which causes braking in associated wheel LBW or RBW. If both pedals LP or RP are acted on, assembly 10 actuates a balancing apparatus, which will be described in detail below in the present description. In synthesis, such a balancing apparatus balances the control pressure outgoing from each master cylinder 12. In this manner, it is ensured that, as a result of the force applied by pistons 15, the same braking torque is applied to wheels LBW, RBW by means of brakes LBB, RBB. Thus, a balanced braking is desirably obtained on both rear wheels LBW, RBW of the vehicle, thereby avoiding vehicle spinning and veering. That aspect of the balancing apparatus is useful especially should a pressure drop occur in the chamber of one of master cylinders 12.

Referring to FIG. 2, the first embodiment of assembly 10 is shown in a partial parallel longitudinal cross-sectional view in which only one master cylinder 12 is visible. FIG. 2 shows master cylinder 12 in a rest condition, where the user does not act on the associated actuating member or pedal.

In FIG. 2, master cylinder 12 includes a hollow body 14 and a primary piston 15 slidably mounted in hollow body 14. Piston 15 defines a respective primary chamber 16 in hollow body 14. Chamber 16 is arranged to contain a fluid having a primary control pressure depending on an actuating force applied to piston 15 movable in hollow body 14. Piston 15 and chamber 16 advantageously have a cylindrical shape with circular cross-section extending around a longitudinal axis X-X coinciding with the operating direction of piston 15.

In the embodiment shown in FIG. 2, piston 15 is connected to a respective pedal LP or RP by means of a rod 18. Rod 18 preferably has a stem 19 ending with a mushroom-shaped head 20 having a rounded surface (for instance, with convex hemispherical shape) which substantially matches a corresponding rounded groove 22 (for instance, with concave hemispherical shape) formed at an axial end of piston 15. Advantageously, resilient rings 24 are mounted between hollow body 14 and rod 18. Such resilient rings 24 surround stem 19 with a radial clearance, so as to permit displacement of rod 18 and yet to act as a stop member for mushroom-shaped head 20. In this first embodiment, stem 18 is surrounded by a protection cap 26 (shown only in part), which is externally locked onto an axial end of hollow body 14.

Preferably, the axial end of piston 15 directed towards rod 18 is circumferentially equipped with an annular sealing gasket 28. Such an annular gasket is for instance a lip gasket. In this first embodiment, piston 15 has a circumferential annular recess 30 located in correspondence of an axially intermediate section 31 thereof. Advantageously, piston 15 ends with a finger-like formation 32 located at the axial end directed towards chamber 16 and acting as a stop member in operating conditions. Advantageously, a stop member for the rest conditions projects radially inwards of hollow body 14 to limit the axial stroke of piston 15. For instance, such a stop member comprises, in a manner known per se, a screw 34 (shown in dashed line), which is housed in a groove (not shown) of intermediate section 31 of piston 15.

In the embodiment shown in FIG. 2, assembly 10 further includes an interception valve, of a type known per se, arranged to stop fluid coming from supply tank ST, Interception valve has an annular pressure-tight gasket 36 circumferentially mounted around piston 15. Advantageously, the interception valve further includes first and second spacer rings 38, 40 sandwiching pressure-tight gasket 36 between them. In this embodiment, the first and second spacer rings 38, 40 are arranged to be suitable translated jointly with annular gasket 36 by piston 15. Preferably, the first spacer ring 38 surrounds a radially constricted portion of intermediate section 31 of piston 15 with a slight radial clearance, whereas the second spacer ring 40 surrounds finger-like formation 32 of piston 15 with a slight radial clearance. In this first embodiment, when master cylinder 12 is not operated and is in a rest position (corresponding to the position shown in FIG. 2), gasket 36 is spaced apart from and does not abut against the constricted portion of intermediate section 31.

Preferably, a cup-like element 42, located between the axial end of chamber 16 and the second spacer ring 40, is mounted around finger-like formation 32 of piston 15. Assembling of cup-like element 42 with finger-like formation 32 takes place so that they are fixedly connected for translation. In this first embodiment, cup-like element 42 has an annular rim 44 bent radially outwards. Advantageously, a thrust spring 46 is interposed between the bottom of cup-like element 42 and the second spacer ring 40 and thrusts sealing gasket 36 in abutment against the first spacer ring 38. Thanks to thrust spring 46, spacer rings 38, 40 and gasket 36 are advantageously kept packed together. Thus, thrust spring 46 acts as a component of the interception valve for the fluid coming from supply tank ST.

A return spring 48 is preferably interposed between the axial end of chamber 16 and annular rim 44 of cup-like element 42.

In this first embodiment, chamber 16 is arranged to receive a fluid through a radial inlet orifice 50 formed in the side surface of hollow body 14 and connectable with supply tank ST. The connection between the compartment of supply tank ST and chamber 16 conveniently takes place through a connecting duct 52 mounted inside orifice 50 in fluid-tight manner thanks to a gasket 54.

Chamber 16 can be connected to a primary utilising device. Hence, the control pressure of the fluid contained in chamber 16 is to be transferred to the utilising device, for instance a driving cylinder. In this first embodiment, the utilising device is one of the driving cylinders of rear brakes LBB, RBB which are mutually coordinated, i.e. they are to receive the same control pressure (and hence they exert the same braking torque) in case braking of both rear wheels LBW, RBW is performed. The utilising device communicates with chamber 16 through a radial outlet orifice 56 formed in the side surface of hollow body 14. Advantageously, but not necessarily, outlet and inlet orifices 56, 50 come out into chamber 16 with parallel axes, and they are located on the same side relative to longitudinal axis X-X.

The structure of the other master cylinder 12, which is not shown in FIG. 2, will not be disclosed herein, since it is substantially a mirror image of the one described above.

Assembly 10 further includes a primary balancing duct, connecting chambers 16 of both master cylinders 12. Such a balancing duct is not wholly shown in FIG. 2, but a section thereof is denoted by reference numeral 58.

Assembly 10 also includes a couple of balancing valves generally denoted 60, only one of which is visible in FIG. 2. Each balancing valve 60 is normally closed and is located between balancing duct 58 and a respective chamber 16 such a balancing valve 60 is associated with.

The operation principle of balancing duct 58 and balancing valves 60 in connection with assembly 10 according to the present invention will be summarised hereinafter.

In this first embodiment of assembly 10, when only one of pedals LP and RP is acted on by a user, rod 18 associated with pedal LP or RP pushes piston 15, which slides in body 14. In this manner piston 15 axially abuts against the first spacer ring 38 and annular gasket 36. In this manner, the fluid flow from connection 52 is intercepted, thereby preventing communication of chamber 16 with tank ST. Consequently, the control pressure in chamber 16 increase proportionally to the pressure applied to piston 15 by rod 18 of corresponding pedal LP or RP. Such a pressure is then transmitted to the associated utilising device, for instance the driving cylinder of one of the mutually coordinated rear brakes LBB, RBB. When one of pistons 15 generates a control pressure exceeding an actuation threshold in the respective chamber 16, balancing valve 60 associated with such a chamber in turn automatically opens. In this manner communication between one of chambers 16 and balancing duct 58 takes place. If, in the other chamber, the control pressure is the atmospheric pressure (and hence it is lower than such an actuation threshold), a corresponding automatic opening of balancing valve 60 associated with the other chamber 16 cannot take place. Thus, in such a situation, balancing duct 58 is not in communication with both chambers 16. Hence, braking of rear wheel LBW or RBW only is allowed. On the contrary, if both pedals LP and RP are acted on, the control pressures in both chambers 16 exceed said actuation threshold and both balancing valves 60 are open, so that chambers 16 of both master cylinders 12 are in communication. Consequently, the control pressure existing in both chambers 16 becomes the same and the driving cylinders of rear brakes LBB, RBB exert the same braking torque on wheels LBW, RBW. In this case, a balanced braking of both wheels LBW, RBW takes place. Advantageously, said actuation threshold is set to a value as low as possible, so that the braking balancing function can be enabled even in case of minimum actuations of pedals LP and RP and, consequently, of pistons 15.

According to the present invention, at least one balancing valve 60 is characterised by having a respective shutter 62 mechanically unconstrained to piston 15 defining chamber 16 such a balancing valve 60 is associated with. Shutter 62 can be operated for opening in a manner fluidically controlled by the control pressure taken by the fluid contained in chamber 16 balancing valve 60 communicates with. Thanks to such features, the balancing of assembly 10 is mechanically separated from the actuation of piston 15, and therefore it can be made according to layouts that can suit different design requirements. In particular, there are obviated the prior art problems related to mounting the shutter of the balancing valves in series with piston 11, what increases the overall longitudinal size of master cylinder 12 and hence of assembly 10. As it will be explained in more detail further on in the description, advantageously balancing valve 60 is made as an interception valve.

Preferably, shutter 62 is slidable in a cavity or housing 64 parallel to chamber 16, and it is movable in a sliding direction parallel to and oppositely oriented with respect to operating direction of piston 15, represented by axis X-X. Displacement of shutter 62 takes place against the action of a resilient return member 66, the preload of which advantageously determines the above-mentioned actuation threshold. Thanks to such features, assembly 10 affords the advantage of including master cylinders 12 having an extremely compact and scarcely cumbersome structure if compared with the prior art solutions. Actually, in this manner, balancing valves 60 are located in parallel (and not in series) to the operating direction of piston 15. Preferably, housing 64 is directly formed in body 14 of master cylinder 12. In the embodiment shown in FIG. 2, the resilient return member is for instance a compression loaded return spring 66 inserted between a bottom shoulder 68 formed in housing 64 and the end face of shutter 62.

Preferably, assembly 10 includes a single casing in which bodies 14 of both master cylinders 12 are formed in such a manner that they are fixedly connected to each other. In the embodiment shown in FIG. 2, the casing is made as a single piece, for instance, it is a single cast obtained by metal casting. Advantageously, also housings 64 are formed inside said casing. Further advantageously, also balancing duct 58 is formed inside said casing. By these features, the overall size of assembly 10 is further limited.

Further preferably, balancing valve 60 has a radial opening or bore 70 formed in housing 64, which opening comes out in balancing duct 58 and is arranged to be closed by shutter 62. Thanks to such features, the overall size of assembly 10 is further reduced.

Advantageously, the seal between shutter 62 and radial bore 70 is of the metal-to-metal type. Thanks to such a feature, there is no longer the need to use an intercepting gasket mounted around shutter 62 in order to provide seal against radial opening 70, as on the contrary occurs according to the prior art. Actually, this would result in unsatisfactory performance in case of repeated use of assembly 10. Moreover, such a feature facilitates the slight fluid leakage from balancing duct 58 occurring through the zone between housing 64 and shutter 62. Should the fluid contained in balancing duct 58 have a considerable volume increase (for instance because of a temperature increase) when both balancing valves 60 are closed, such leakage allows preventing a pressure increase.

Moreover, housing 64 is optionally equipped with a first stop member, consisting for instance of a first shoulder 72, intended to abut against an end surface of shutter 62 and to stop its displacement. Also in this case, when the end surface of shutter 62 and the first shoulder 72 are mutually contacting, a metal-to-metal seal is obtained.

Preferably, housing 64 has a first portion communicating with chamber 16 and a second portion communicating with tank ST. In this manner, accumulation of fluid in housing 64 is avoided, which would risk to compromise the operation of balancing valve 60. Actually, the twofold communication capability (with chamber 16 and tank ST) prevents the fluid possibly accumulated from remaining in a blind space in housing 64 thereby hindering the proper displacement of shutter 62. More particularly, the axial ends of housing 64 radially come out through a first radial opening 74 communicating with chamber 16 and a second radial opening 76 communicating with the associated compartment of tank ST through inlet orifice 50. For instance, housing 64 is made as a cylindrical cavity with circular cross-section oriented parallel to the sliding direction of shutter 62.

In the embodiment shown in FIG. 2, assembly 10 further includes a second stop member for shutter 62. Preferably, the second stop member is a screw member 78 mounted into housing 64 through hollow body 14. Screw member 78 tightly seals housing 64 and has a finger-like formation 80 projecting into said housing 64 and acting as an abutment for a head surface of shutter 62. Advantageously, a washer 82 is arranged between screw member 78 and hollow body 14 in order to better ensure the fluid-tight coupling.

Figure 3:
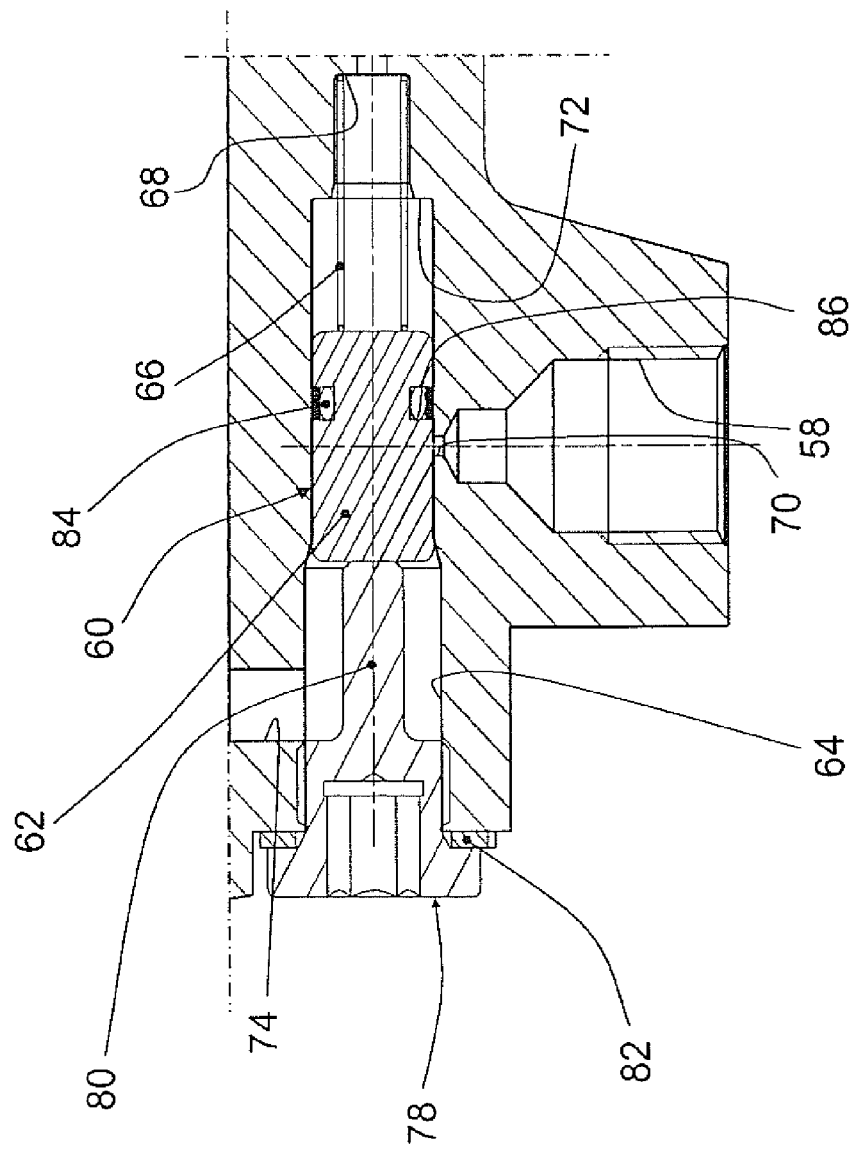
FIG. 3 is a meridian longitudinal cross-sectional view of one of the master cylinders belonging to a variant of the first embodiment of the master cylinder assembly shown in the previous Figures.

FIG. 3 shows a variant of the first embodiment of assembly 10 shown in FIG. 2. Such a variant concerns shutter 62, which is equipped with a sealing gasket 84 arranged around it. Sealing gasket 84 can be displaced jointly with shutter 62 so that it remains operatively positioned in a region of housing 64 located beyond radial bore 70. For instance, sealing gasket 84 is mounted in an annular groove 86 peripherally formed around shutter 62. In the embodiment shown in FIG. 3, during displacement of shutter 62, sealing gasket 84 remains operatively positioned in a region of housing 64 located between radial bore 70 and radial opening 76 (visible in FIG. 2 only). More specifically, the position of sealing gasket 84 is operatively variable between radial bore 70 and the first shoulder 72. Thanks to such features, the wear of a gasket 84, which one possibly wants to arrange around shutter 62, is limited. Indeed, in this manner, sealing gasket 84 remains always operatively positioned beyond radial bore 70 and cannot undesirably scrape against the latter, with the risk of tearing.

Second Embodiment

Tandem Master Cylinders

FIGS. 4 to 7 show a second embodiment of an assembly according to the present invention, generally denoted 110.

Elements structurally and/or functionally similar to those described with reference to the first embodiment are denoted by the same alphanumerical reference symbols.

Referring to FIGS. 4 to 7, assembly 110 still comprises two master cylinders 12.

Each master cylinder 12 is a tandem cylinder, i.e. it includes a hollow body 14, a primary piston 15 and a secondary piston 115 slidably mounted in hollow body 14 and associated with respective primary and secondary chambers 16, 116, separated from each other in fluid-tight manner. Consequently, there is a substantial doubling of the components of each master cylinder 12 with respect to what has been disclosed in connection with the first embodiment. Thus, in order to make the present description simpler and clear, elements structurally and/or functionally duplicated with respect to what has been disclosed with reference to the first embodiment are denoted by the same alphanumerical reference symbols preceded by digit 1.

Preferably, primary piston 15 is associated with rod 18, whereas secondary piston 115 is kept spaced apart from primary piston 15 in a manner known per se. Primary piston 15 and secondary piston 115 are connected by an enlarged-head screw 118 secured to primary piston 15 and slidably mounted in secondary piston 115. As it can be appreciated, pistons 15, 115 and chambers 16, 116 are aligned and mutually coaxial with respect to axis X-X.

In this second embodiment, primary return spring 48 is interposed between primary piston 15 and secondary piston 115, whereas secondary return spring 148 is interposed between the axial end of secondary chamber 116 and secondary piston 115. Primary return spring 48 preferably has a greater preload than secondary return spring 148. Advantageously, a further cup-like element 42a is inserted between primary return spring 48 and secondary piston 115 and is arranged in mirror-like manner with respect to primary cup-like element 42. Thus, primary return spring 48 is preferably arranged between the annular rims (to which no reference numeral is associated) of primary cup-like element 42 and the annular rims (to which also no reference numeral is associated) of the further cup-like element 42a. Advantageously, the preload of primary return spring 48 is adjusted thanks to mounting enlarged-head screw 118 on primary piston 15. In this manner, pistons 15, 115 are resiliently kept spaced apart during translation in their operating directions.

The seal between pistons 15, 115 and the respective chambers 16, 116 is obtained by measures known to the skilled in the art. Consequently, for the sake of conciseness, such measures will not be described. It is only pointed out that, in this embodiment, fluidic separation between primary chambers 16 and secondary chambers 116 occurs in known manner thanks to gasket 128 carried by secondary piston 115.

Figure 4:
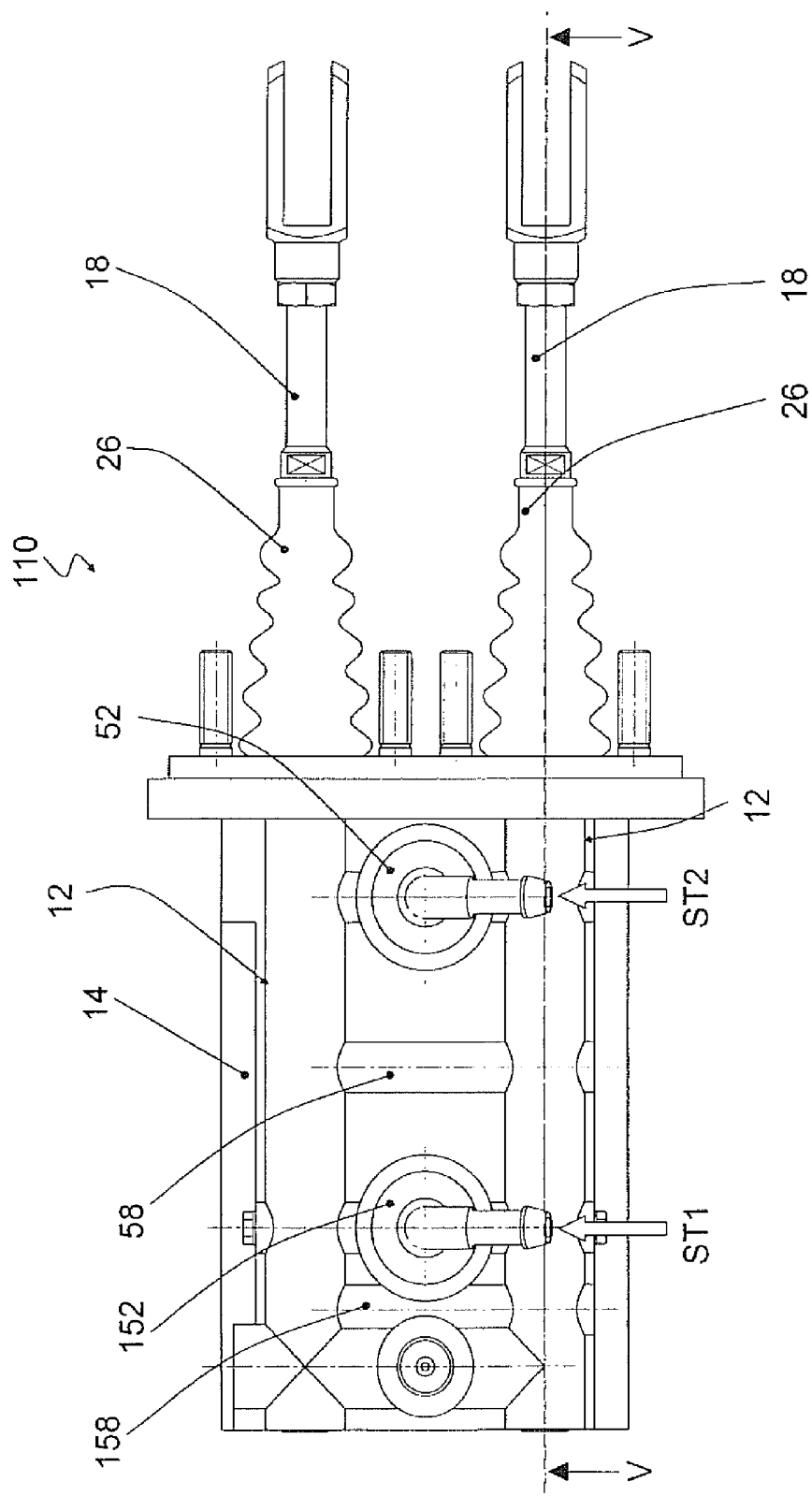
FIG. 4 is a top plan view of a second exemplary embodiment of a master cylinder assembly according to the present invention.
Figure 5:
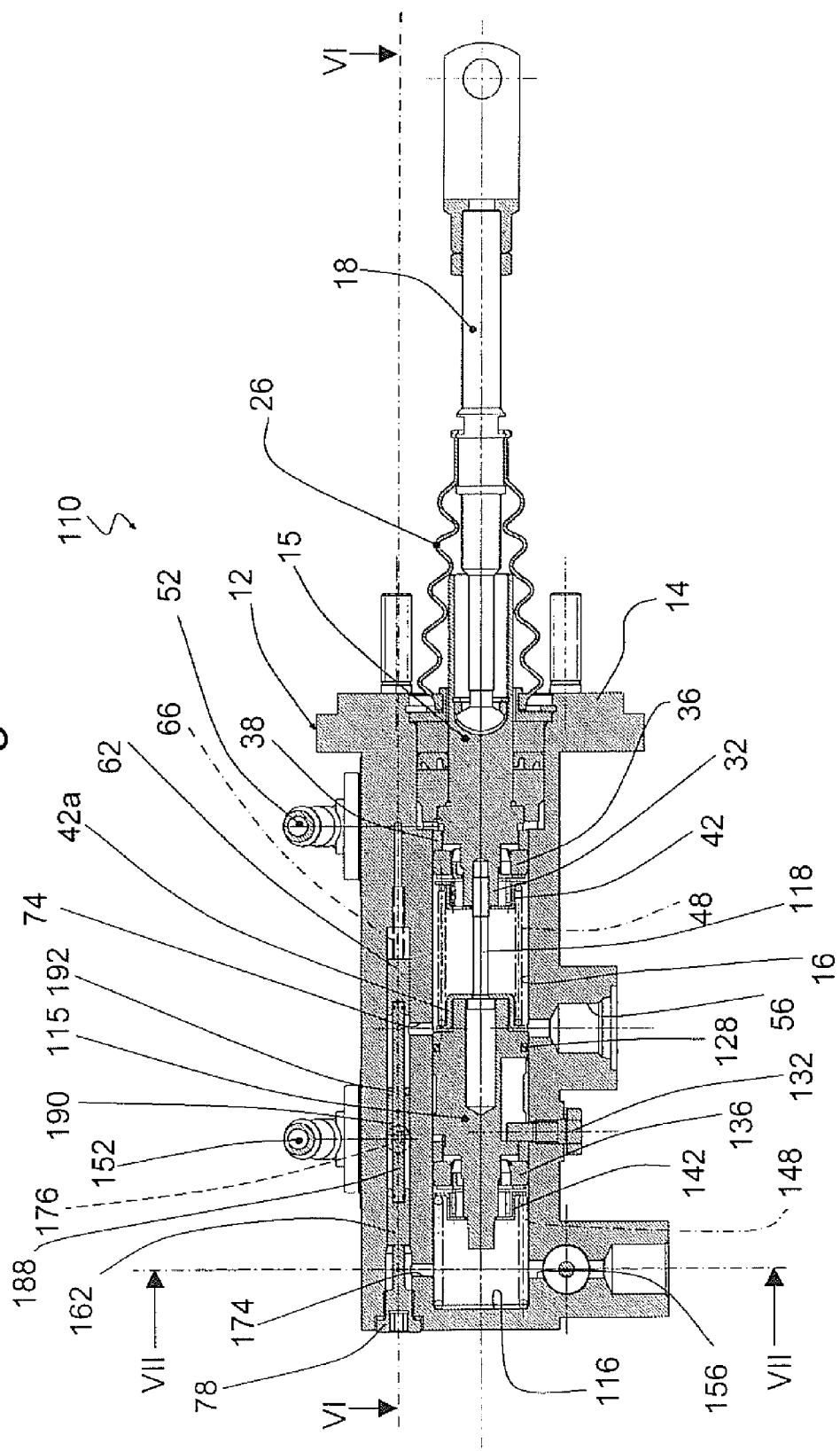
FIG. 5 is a meridian longitudinal cross-sectional view related to the second embodiment of the master cylinder assembly and taken along dotted and dashed line V-V shown in FIG. 4.

As shown in FIGS. 4 and 5, chambers 16, 116 are arranged to receive a fluid supplied by a primary supply tank ST1 communicating with both primary chambers 16 and by a secondary supply tank ST2 communicating with both secondary chambers 116. Supply tanks ST1 and ST2 are mutually separated or they are independent and isolated compartments of a single tank.

Moreover, in each master cylinder 12, primary chamber 16 and secondary chamber 116 can be connected to a primary utilising device and a secondary utilising device (not shown), respectively, hydraulically separated from each other. As it will become clear below, each primary utilising device can be one of rear brakes LBB, RBB of a braking system similar to that shown in FIG. 1. On the contrary, each secondary utilising device can be a corresponding additional rear brake LBB2 or RBB2. Preferably, primary and secondary chambers 16, 116 can be connected to the corresponding primary and secondary utilising devices through a primary outlet orifice 56 and a secondary outlet orifice 156, respectively, formed in hollow body 14 and communicating with the associated primary chamber 16 and the associated secondary chamber 116, respectively.

Assembly 110 further includes a secondary balancing duct 158 (FIGS. 4 and 6) connecting secondary chambers 116 with each other. Secondary balancing duct 158 communicates, at its ends, with secondary chambers 116 through a couple of secondary balancing valves 160. Preferably, primary and secondary balancing ducts 58, 158 are parallel to each other.

Also secondary balancing valve 160 has a respective secondary shutter 162 that is mechanically unconstrained to secondary piston 115 and is operable for opening in a manner fluidically controlled by a secondary control pressure taken by the fluid contained in secondary chamber 116.

In this second embodiment, in each master cylinder 12, primary and secondary shutters 62, 162 located on a same side of balancing ducts 58, 158 are each slidable in the same housing 64 formed in body 14 of master cylinder 12 associated therewith. Preferably, primary shutter 62 and the associated secondary shutter 162 are slidable in a direction parallel to and oppositely oriented with respect to the operating directions of pistons 15, 115, against the action of the same resilient return member 66.

Figure 6:
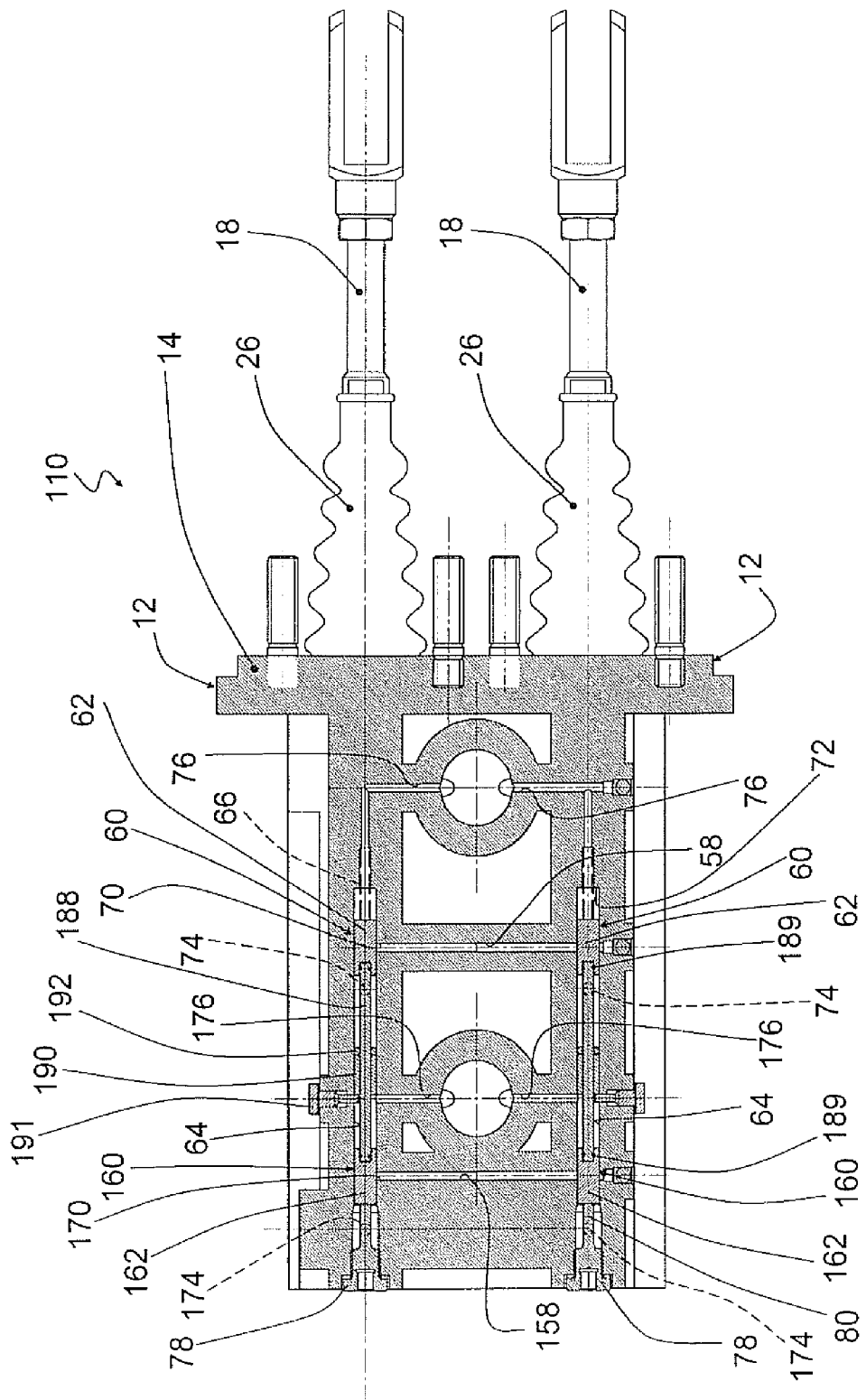
FIG. 6 is a parallel longitudinal cross-sectional view related to the second embodiment of the master cylinder assembly and taken along dotted and dashed line VI-VI shown in FIG. 5.

Each primary shutter 62 and the associated secondary shutter 162 are displaceable in mutually coordinated manner so as to jointly open or close the same side of primary and secondary balancing ducts 58, 158. Preferably, primary and secondary shutters 62, 162 are jointly displaceable, in particular they are fixedly connected for translation. Preferably, a connecting rod or peg 188 is arranged between such shutters. Advantageously, the ends of rod 188 are connected to the respective couple of shutters 62, 162 by means of a respective couple of resilient rings 189 (FIG. 6). Preferably, such resilient rings 189 are circumferentially inserted between the ends of rod 188 penetrating into shutters 62 and 162 and the shutters themselves. For instance, resilient rings 189 are of the so-called "cir-clip" type, known per se.

In this second embodiment, a tubular member or sleeve 190 is arranged around connecting rod 188 and increases the radial size of a section of said connecting rod 188. Moreover, a screw 191 is mounted through body 14, which screw radially projects into housing 64 and acts as a stop for sleeve 190 when one or both shutters 62, 162 are pushed by the fluid coming from primary and/or secondary chambers 16, 116. Thus, thanks to the use of screw 191, a further element is added that limits the stroke of shutters 62, 162 in their common housing 64 between shoulder 72 and finger-like formation 80 (FIG. 6). Advantageously, a sealing gasket 192 is further provided and is located around connecting rod 188 between said primary and secondary shutters 62, 162. Sealing gasket 192 has the advantage of fluidically separating said primary and secondary shutters 62, 162 in housing 64. More specifically, sealing gasket 192 fluidically divides housing 64 into a first portion associated with the balancing circuit of primary chambers 16 and a second portion associated with the balancing circuit of secondary chambers 116.

Figure 7:
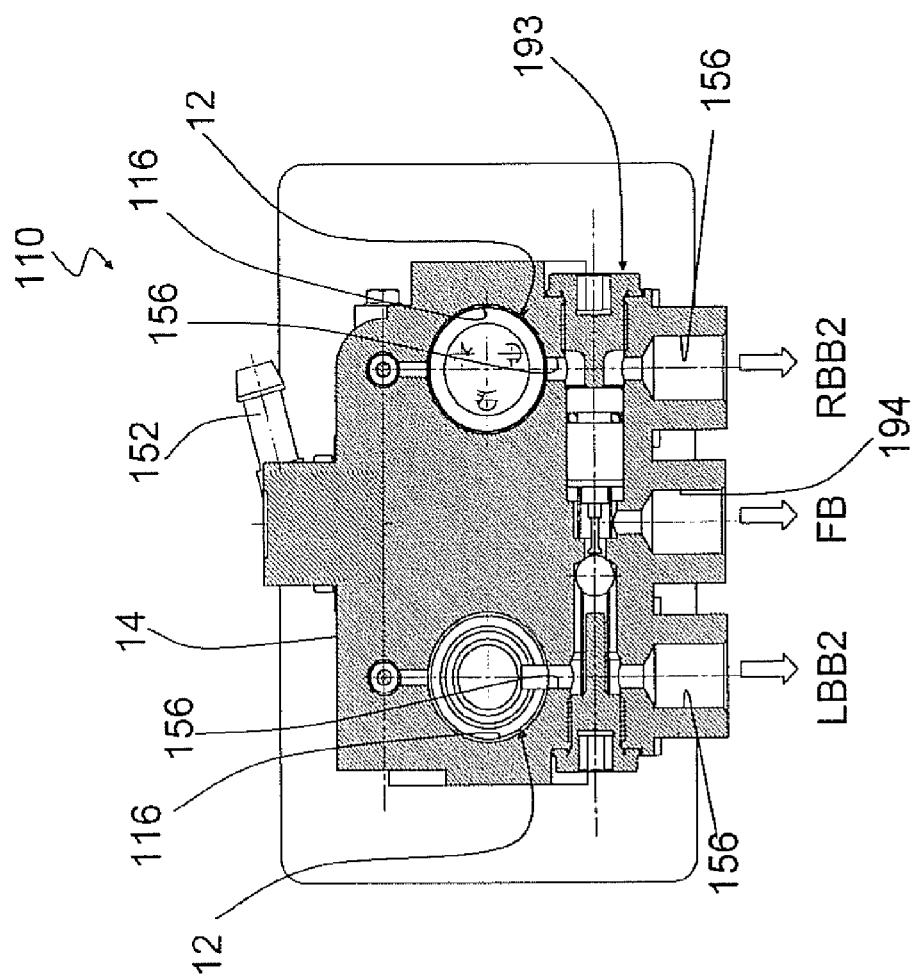
FIG. 7 is a cross-sectional view related to the second embodiment of the master cylinder assembly and taken along dotted-and-dashed line VII-VII shown in FIG. 5.

Referring in particular to FIG. 7, it is to be appreciated that each secondary outlet orifice 156 can be axially connected with the respective secondary utilising device, e.g. a secondary rear-wheel brake LBB2 or RBB2 of a vehicle braking system BS. Preferably, moreover, both secondary outlet orifices 156 generally are throughholes of which an axially intermediate section comes out in a selecting valve device 193 of a kind known per se. For instance, such a valve device 193 is an AND-type logic valve (also referred to in the art as "logic head") for disconnecting the front brakes. In this second exemplary embodiment, valve device 193 is a so-called shuttle valve. In synthesis, valve device 193 is advantageously suitable for selectively putting both secondary outlet orifices 156 in communication with a further end orifice 194 that can be connected with a further utilising apparatus, for instance a couple of mutually coordinated front brakes FB of a vehicle braking system BS. Communication between secondary outlet orifices 156 and end orifice 194 takes place when the pressure taken by the fluid flowing out from both secondary outlet orifices 156 attains a threshold value such as to open valve device 193.

The operation of the second embodiment of assembly 110 according to the present invention will now be described.

If only one of rods 18 is actuated, an operation similar to that described for the first embodiment of assembly 10 takes place. In synthesis, through the cooperation of rod 18, primary piston 15 and primary return spring 48, both pistons 15, 115 of the same master cylinder 12 close fluid communication with supply tanks ST1, ST2 and generate a control pressure in the respective chambers 16, 116. In this manner, only balancing valves 60, 160 located on the same side of balancing ducts 58, 158 open, whereas balancing valves 60, 160 located on the opposite side do not open. Consequently, there is no fluid flow between the couple of primary chambers 16 and the couple of secondary chambers 116 through balancing ducts 58, 158. Yet, let we assume that primary chamber 16 associated with primary piston 15 has a failure in delivering the primary control pressure towards the primary utilising device associated therewith. In this case, primary piston 15 compresses preloaded spring 148 and pushes secondary piston 115. Thus, a secondary control pressure is anyway generated in secondary chamber 116 and is transmitted to the secondary utilising device. This feature is of particular value in a vehicle braking system. Actually, if there is a failure in pressure delivery towards primary brake LBB or RBB of a rear wheel LBW or RBW, at least the secondary brake LBB2 or RBB2 associated with the same rear wheel LBW or RBW can intervene.

If both rods 18 are operated, all pistons 15, 115 generate a control pressure in the respective chambers 16, 116. In this manner, all balancing valves 60, 160 open and hence a fluid flow occurs between the couple of primary chambers 16 through balancing duct 58 and between the couple of secondary chambers 116 through balancing duct 158. In this manner, a balancing of the control pressures for the couple of primary chambers 16 and the couple of secondary chambers 116 is jointly obtained.

Let we assume that, in a same master cylinder 12, primary chamber 16 associated with primary piston 15 has a failure in delivering the primary control pressure towards the primary utilising device associated therewith. In this case, primary piston 15 compresses return spring 48 and pushes secondary piston 115. In this manner, a secondary control pressure is anyway generated in secondary chamber 116. Such a secondary control pressure is supplied to secondary shutter 162, which slides in housing 64 in coordinate manner with primary shutter 62. Consequently, even if the fluid contained in primary chamber 16 does not take a control pressure sufficient to open primary balancing valve 60 associated therewith, the movement of secondary shutter 162 will pull primary shutter 62, thereby automatically opening also primary balancing duct 58. In this manner, a balancing of the control pressures supplied by the couple of primary chambers 16 is obtained.

Similarly, if one of secondary chambers 116 associated with secondary piston 115 has a failure in delivering the secondary control pressure towards the secondary utilising device associated therewith and also towards the further utilising device associated therewith, the same advantageous situation occurs. Actually, the primary control pressure generated in primary chamber 16 through primary balancing duct 58 pushes primary shutter 62 and gasket 192 that cooperates with sleeve 190 abutting against screw 176. Hence, primary shutter 62 is pushed by the primary control pressure in chamber 16, acting onto an annular area corresponding to the difference between the area of primary shutter 62 and the area of connecting rod 188, thereby pulling secondary shutter 162 fixedly connected therewith, with the consequent balancing of the secondary control pressures. This feature is of particular value in a vehicle braking system. Actually, let we assume that there is a fall in the secondary control pressure taken by the fluid within one of secondary chambers 116 and directed towards one of secondary rear brakes LBB2 or RBB2 and at the same time towards the further front brakes FB. The fact that balancing of secondary control pressures outcoming from secondary chambers 116 is anyway possible, allows in any case a balanced actuation of primary rear brakes LBB and RBB.

As a skilled in the art will appreciate, some optional modifications can be made in such a second embodiment.

According to a variant, shutters 62, 162 can be equipped with a sealing ring having the same features as gasket 84 shown in FIG. 3.

According to a further variant, secondary outlet orifices 156 in secondary chambers 116 are connectable to the further utilising device only (for instance, the apparatus of front brakes FB) through selecting valve device 193, and the possibility of connecting secondary outlet orifices 156 with the secondary utilising devices (for instance, secondary rear brakes LBB2 and RBB2) is not provided for. In the alternative, secondary outlet orifices 156 are connectable to the respective secondary utilising devices (for instance, secondary rear brakes LBB2 and RBB2) only, and the possibility of connecting such secondary outlet orifices 156 with the further utilising device (for instance, the apparatus of front brakes FB) is not provided for.

Further Variant Embodiments

Further variant embodiments of the invention will be described hereinafter. As it will be apparent for a skilled in the art, such variants concern advantageous details that can be optionally applied to each of the embodiments previously described.

Elements structurally and/or functionally similar to those described with reference to the first and second embodiments are denoted by the same alphanumerical reference symbols.

Referring in particular to FIG. 8, reference numeral 264 denotes a variant embodiment of the cavity or housing in which primary shutter 62 is slidably mounted.

As shown, housing 264 preferably has a radially widened portion 264a in correspondence of the region where primary shutter 62 is to slide and where balancing duct 58 opens. Otherwise stated, widened portion 264a has a radial extension exceeding the width of shutter 62, so that a peripheral gap is formed between shutter 62 and housing 264 in the region where balancing duct 58 opens.

Advantageously, widened portion 264a is substantially ring-shaped. In the variant embodiment illustrated, widened portion 264a is a groove formed in the internal side walls of housing 264. Preferably, but not necessarily, the groove extends over the whole side surface defined by housing 264, and defines for instance a circumference.

Such a variant embodiment is particularly advantageous for the following reasons.

In some operating conditions, the actuating members or pedals are not simultaneously operated (for instance, because of different pedal regulations) or the fluid present in different chambers may take the same control pressure upon different strokes of such actuating members (for instance, due to the presence of air in one of the circuits).

In both situations mentioned above, one of the chambers (for instance, the left chamber) may attain even a high control pressure, whereas the other (e.g. the right chamber) may have a control pressure that still equals the atmospheric pressure. In this manner, the control pressure in the first (left) chamber applies a radial push onto the shutter of the other (right) chamber through the balancing duct, thereby creating a sliding friction for the latter shutter. Consequently, the actuation threshold the control pressure is to exceed in the right chamber is undesirably increased above the preset value. Actually, in such a situation, the control pressure in the right chamber must overcome also the above-mentioned sliding friction, besides the elastic return force normally exerted by return member 66.

Thanks to the provision of radially widened portion 264a, sliding of shutter 62 associated with a respective chamber is substantially made unaffected by the overpressure possibly generated in the balancing duct and coming from the other chamber.

Of course, as it will be apparent for a skilled in the art, such a variant embodiment of housing 64 can be associated with one or more primary shutters 62 or one or more secondary shutters 162.

Always referring to FIG. 8, there is shown a variant embodiment including a guiding member denoted 262, intended to guide the sliding of shutter 62 in cavity or housing 64. Preferably, a portion of such a guiding member 262 is arranged to slide in a radially constricted end section 263 of housing 64. Such a portion axially extends relative to housing 64.

Advantageously, such an end section 263 corresponds to the section where the resilient return member, e.g. return spring 66, is located. Preferably, such an end section 263 is located between the first shoulder 72 and end shoulder 68.

Preferably, guiding member 262 has a ferrule shape axially arranged relative to housing 64, and has a radially widened head 262a and a radially constricted stem 262b. Advantageously, head 262 axially abuts against shutter 62. Also advantageously, stem 262b is slidable in end section 263.

In the variant embodiment illustrated, the resilient return member, e.g. spring 66, is located between head 262a and end shoulder 68 and it assists in maintaining centring of guiding member 262 (and hence of shutter 62).

Preferably, guiding member 262 is made at least in part of a soft material, e.g. aluminium or aluminium alloys, brass, copper and plastic material. In this manner, the front seal against shoulder 72 is improved. In this respect, guiding member 262 can also advantageously include a gasket, for instance mounted around stem 262b and in correspondence of head 262a. Such a gasket can be co-moulded with guiding member 262 or can be merely applied thereon.

Of course, as it will be apparent for a skilled in the art, such a variant embodiment can be associated with one or more primary shutters 62 in the first and second embodiments.

In the first and second embodiments, the annular gaskets denoted 28, 128 and 36 are mounted on piston(s) 15, 115. As an alternative to such gaskets described above, according to a variant embodiment of the invention, alternative sealing elements can be on the contrary inserted into seats formed to this aim in the internal walls of chambers 16, 116. For instance, such sealing elements could include one or more lip annular gaskets (by way of example, see gasket 236 shown in FIG. 8).

suitable for acting in static conditions on sliding piston(s) 15, 115, according to an arrangement that is usually referred to as "plunger" arrangement.

Further Advantages of the Invention

A skilled in the art will readily understand that both exemplary embodiments of the master cylinder assembly according to the invention are adaptable also to different and further kinds of braking systems. For instance, the master cylinder assembly (with a simple cylinder or a tandem cylinder arrangement) can be used in braking systems including a servo-assisted braking function.

Moreover, the principles of the present invention can also be employed in an assembly including differential master cylinders. The structure of a differential master cylinder is known in the art, and such a cylinder has a cavity with a wider and a narrower cylinder portion, having a greater and a smaller diameter, respectively, and being generally intended for different functions and different fluidic circuits.

Without departing from the scope of the present invention, the first and second embodiments of master cylinder assembly 10, 110 can undergo further modifications. For instance, the number of master cylinders arranged in parallel is not strictly limited to two. Indeed, it is clear for a skilled in the art that, in case of fields of application different from the vehicle braking systems, several master cylinders can be used, the pressurised chambers of which communicate in couples through respective balancing ducts or through a single balancing duct having multiple branches.

Of course, while maintaining the principle of the invention unchanged, the particular embodiments and the constructional details can be widely changed with respect to what has been described and shown, without departing from the scope of the invention as defined in the appended claims.

The invention claimed is:

1. Master cylinder assembly for balancing the braking between at least a couple of wheels of a vehicle, comprising:
    a plurality of master cylinders, each having a hollow body, a primary piston mounted slidable into said hollow body following a working direction, and a primary chamber defined by said primary piston in said hollow body and suitable for containing a fluid having a primary control pressure depending on a driving force applied on said primary piston movable into said hollow body; said primary control pressure configured to be transmitted to at least one primary user device connectable to said primary chamber;
    a primary balancing duct into which comes out at least a couple of said primary chambers configured to transmit the respective primary control pressures to at least a couple of coordinated primary user devices; and
    a plurality of respective primary balancing valves which are normally closed, each of them being located between said primary balancing duct and a respective primary chamber;
    wherein at least one of said primary balancing valves has a primary shutter mechanically unconstrained to the primary piston defining the primary chamber to which said at least one primary balancing valve is associated; said primary shutter being operable so as to open in a fluid-controlled manner by the primary control pressure assumed by the fluid contained in the primary chamber to which said at least one primary balancing valve is associated,
    wherein said primary shutter is slidable in a respective housing integral with the master cylinder hollow body and parallel to said chamber, and is movable in a sliding direction which is parallel and opposite to the working direction of the primary piston against the action of elastic return means, and
    wherein said primary balancing valve has a respective hole radially provided through the housing with respect to said sliding direction, coming out into said primary balancing duct, and suitable for being obstructed by said primary shutter.

2. The assembly according to claim 1, wherein said primary shutter is provided with a respective sealing gasket mounted therearound and movable as a unit with said primary shutter in such a manner to remain operationally situated within a region of the housing located beyond said hole.

3. The assembly according to claim 1, wherein said primary shutter is without sealing gaskets.

4. The assembly according to claim 1, wherein said housing has a first portion communicating with the respective primary chamber, and a second portion configured to communicate with a respective supply tank which is configured to provide said primary chamber with fluid.

5. The assembly according to claim 2, wherein said housing has a first portion communicating with the respective primary chamber, and a second portion configured to communicate with a respective supply tank which is configured to provide said primary chamber with fluid.

6. The assembly according to claim 1, wherein each master cylinder further has a secondary piston mounted slidable into said hollow body and cooperating with said primary piston, and a secondary chamber respectively defined by said secondary piston in said hollow body and fluidically separate from said primary chamber; said secondary chamber being suitable for containing a fluid respectively having a secondary control pressure depending on the primary control pressure acting on said secondary piston in said hollow body, and which is configured to be transmitted to a further secondary user device respectively connectable to said secondary chamber; said assembly further comprising:
    a secondary balancing duct into which comes out at least a couple of said secondary chambers configured to transmit the respective secondary control pressures to at least one secondary user device; and
    a plurality of respective secondary balancing valves, normally closed, each of them being located between said secondary balancing duct and a respective secondary chamber; at least one of said secondary balancing valves having a respective secondary shutter mechanically unconstrained to the secondary piston defining the secondary chamber to which said secondary balancing valve is associated; said secondary shutter-being operable so as to open in a fluid-controlled manner by the secondary control pressure assumed by the fluid contained in the secondary chamber to which said secondary balancing valve is associated.

7. The assembly according to claim 6, wherein at least one primary shutter is movable in a coordinated manner with the respective secondary shutter belonging to the same master cylinder so as to free or obstruct at the same time the same side of the primary balancing duct and of the secondary balancing duct.

8. The assembly according to claim 7, wherein said primary shutter and said secondary shutter belonging to the same master cylinder are both slidable into the same housing provided in the hollow body of said master cylinder.

9. The assembly according to claim 8, wherein said primary shutter and said secondary shutter are connected by a rod.

10. Braking system for a vehicle, particularly for an agricultural vehicle, comprising:
- at least a primary supply tank containing a fluid;
- at least a couple of brakes, each of them configured to act on a respective wheel of said vehicle;
- a couple of pedals configured to be operated by a user, said pedals being associated to respective driving members;
- a master cylinder assembly according claim 1, wherein each chamber is connected to at least one supply tank in order to receive said fluid therefrom; each piston being connected to a respective driving member and being displaceable as a result of an operation thereof; each of said chambers being further connected to the control cylinder of at least one of said brakes so as to provide said control cylinder with the control pressure.

11. The system according to claim 10, comprising a couple of primary back brakes configured to act on a respective couple of back wheels of said vehicle, and wherein each of said master cylinder has a respective primary chamber connected to said primary supply tank and to the control cylinder of one of said primary back brakes coordinated with each other; said primary chambers coming out into said primary balancing duct through said primary balancing valves.

12. The system according to claim 11, further comprising a couple of secondary front brakes configured to act on a respective couple of front wheels of said vehicle, and/or a couple of secondary back brakes configured to act on said back wheels; each of said master cylinders further having a respective secondary chamber connected to a secondary supply tank and to the control cylinder of at least one respective secondary brake said secondary chambers coming out into said secondary balancing duct through said secondary balancing valve.

13. Method for balancing the control pressures generated by an assembly including at least a couple of master cylinders each having a hollow body, and comprising a primary chamber defined by a primary piston; said method comprising the following steps:
- generating respective primary control pressures in at least a couple of said primary chambers of the master cylinders by applying a force on the associated primary pistons;
- selectively communicating with said primary chambers in order to reciprocally balance the respective primary control pressures; and
- transmitting said reciprocally balanced primary control pressures to at least a couple of primary user devices which are coordinated with each other;
- wherein the selective communication with said primary chambers occurs through a respective hole radially provided through a respective housing integral with the master cylinder hollow body and parallel to said chamber, in a manner which is fluid-controlled by the respective primary control pressures assumed by the fluid contained in said primary chambers and in manner which is mechanically unconstrained to the primary piston through a primary shutter slidable in said respective housing parallel and opposite to the working direction of the primary piston, said primary shutter being suitable for obstructing the respective hole.

14. The method according to claim 13, wherein said master cylinder assembly controls the braking of at least a couple of wheels of a vehicle, by transmitting said reciprocally balanced control pressures to at least one control chamber of brakes coordinated with each other, each of said brakes being associated to one respective of said wheels.

15. Master cylinder assembly for balancing the braking between at least a couple of wheels of a vehicle, comprising:
- a plurality of master cylinders, each having a hollow body, a primary piston mounted slidable into said hollow body following a working direction, and a primary chamber defined by said primary piston in said hollow body and suitable for containing a fluid having a primary control pressure depending on a driving force applied on said primary piston movable into said hollow body; said primary control pressure configured to be transmitted to at least one primary user device connectable to said primary chamber;
- a primary balancing duct into which comes out at least a couple of said primary chambers configured to transmit the respective primary control pressures to at least a couple of coordinated primary user devices; and
- a plurality of respective primary balancing valves which are normally closed, each of them being located between said primary balancing duct and a respective primary chamber;
- wherein at least one of said primary balancing valves has a primary shutter mechanically unconstrained to the primary piston defining the primary chamber to which said at least one primary balancing valve is associated; said primary shutter being operable so as to open in a fluid-controlled manner by the primary control pressure assumed by the fluid contained in the primary chamber to which said at least one primary balancing valve is associated;
- wherein said primary shutter is slidable in a respective housing integral with the master cylinder hollow body and parallel to said chamber, and is movable in a sliding direction which is parallel and opposite to the working direction of the primary piston against the action of elastic return means, and
- wherein said housing has a first portion communicating with the respective primary chamber, and a second portion configured to communicate with a respective supply tank which is configured to provide said primary chamber with fluid.

16. The assembly according to claim 15, wherein said primary shutter is without sealing gaskets.

* * * * *